May 10, 1966   D. L. THECKSTON   3,249,959
WIPER BLADE WITH EMBEDDED HEATING ELEMENT
Filed Dec. 27, 1963

Dana L. Theckston
INVENTOR.

BY *Chauncey A. O'Brien*
*and Harvey B. Jacobson*
Attorneys various parts described. With existing materials now available and the vehicle battery sources of electrical energy in common use, the construction of the present invention provides a more practical means for producing the requisite heating. Also, the more even distribution of the heat dissipated by the blade assembly achieves the objectives of the invention in a most efficient manner.

United States Patent Office 3,249,959
Patented May 10, 1966

3,249,959
WIPER BLADE WITH EMBEDDED
HEATING ELEMENT
Dana L. Theckston, 16440 15th SW., Seattle, Wash.
Filed Dec. 27, 1963, Ser. No. 333,828
5 Claims. (Cl. 15—250.06)

This invention relates to an electrically heated windshield wiper assembly and more particularly to a new and useful wiper blade construction embodying heating facilities for facilitating removal of ice formations and precipitation under freezing conditions from the windshield of a vehicle.

A primary object of the present invention is to provide a heated type of wiper blade construction capable of dissipating the requisite quantity of heat onto the windshield being wiped in a more efficient manner so as to reduce the drain of electrical energy to a lower and more practical value for automotive vehicle installations. This is accomplished by embedding the heating element completely within the wiper blade itself spaced from the rigid blade holder.

Another object of the present invention in accordance with the foregoing object is to provide a wiper blade construction wherein the heating facilities are mounted in a novel manner for uniform distribution of the heat by coiling a conductive wire about the heating element.

A still further object of the present invention is to provide a heated wiper blade construction which is economical in cost and capable of being tailored to various installational requirements by folding an insulated resistance heating wire having a total length exceeding the length of the blade and holding it folded by coiling of the conductive wire thereabout throughout its folded length.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
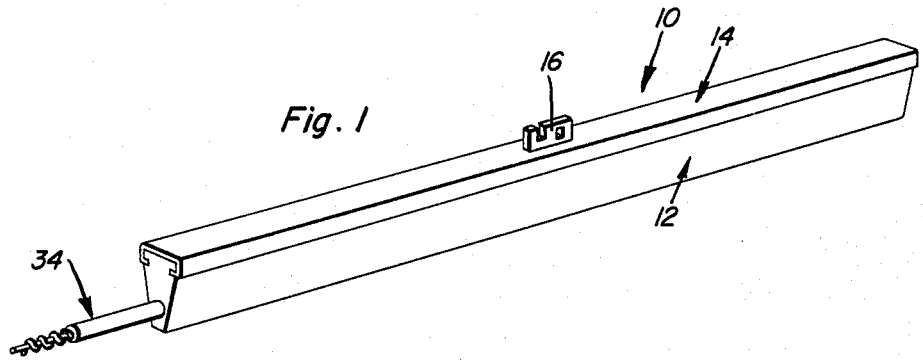
FIGURE 1 is a perspective view of a wiper blade assembly made in accordance with the present invention.
Figure 2:
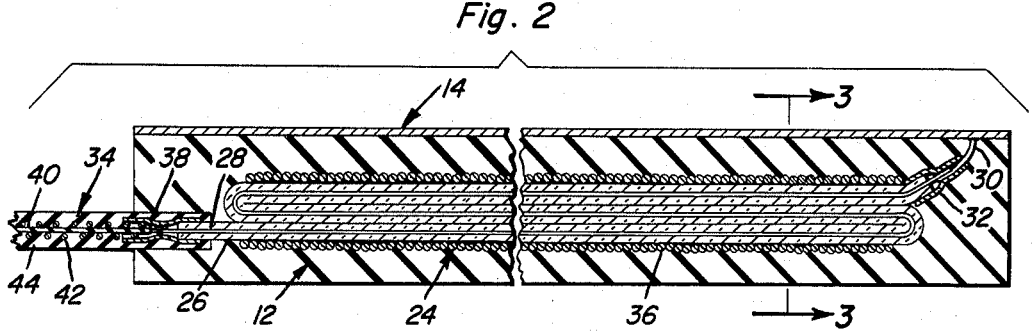
FIGURE 2 is a longitudinal sectional view through the wiper blade assembly illustrated in FIGURE 1.
Figure 3:
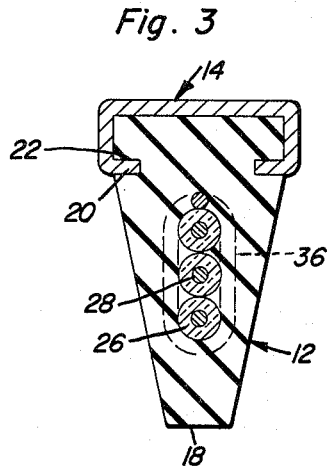
FIGURE 3 is a transverse sectional view taken substantially through a plane indicated by section line 3—3 in FIGURE 2.
Figure 4:
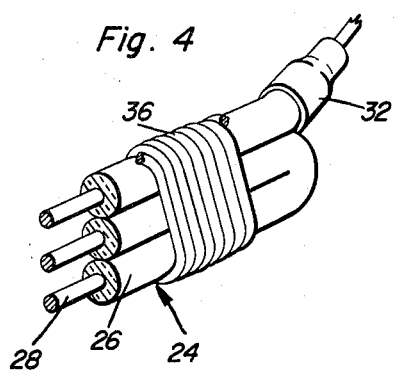
FIGURE 4 is a perspective view of a portion of the heating facilities associated with the wiper blade assembly.

Referring now to the drawings in detail, the wiper blade assembly generally referred to by reference numeral 10 is composed of a flexible blade element 12 and a rigid blade holder 14 adapted to be connected to the oscillating lever element of the wiper blade drive through the connector 16. As more clearly seen in FIGURE 3, the blade element 12 tapers toward a relatively narrow contact end 18 in cross-section, the wider opposite head portion being embraced by the holder 14 which is generally channel shaped in cross-section and having inwardly extending portions 20 received within aligned longitudinal grooves 22 formed in the flexible blade element 12. The blade element is made of any suitable heat resistant material such as silicone rubber capable of withstanding extreme temperature variations as for example exemplified by a temperature range of −85° F. to 700° F. The holder 14 on the other hand, is made of a rigid, conductive metal so that it may establish a ground connection for the heating circuit associated with the wiper blade assembly.

Heating facilities for the wiper blade assembly generally referred to by reference numeral 24 is completely embedded within the blade element 12 and arranged to flex therewith as the blade element is driven across the windshield surface it is cleaning. The heating facilities include an elongated flexible tubular member 26 which is made of non-conductive material such as flexible glass or a suitable plastic. The tubular member 26 is disposed in a folded condition within the blade element, three folds being illustrated so as to have an unfolded length substantially exceeding the length of the blade and yet be spaced from the blade contact end 18 and the holder 14. Extending through the tubular member in the same folded arrangement, is a resistance wire 28 such as Nichrome constituting the heat generating element. One end portion of the resistance wire 28 is electrically connected by the lead 30 to the holder 14 for grounding purposes, a non-conductive coupling sleeve 32 protectively enclosing the end portion of the resistance wire. The other end portion of the resistance wire is electrically connected by the lead-in connection 34 to a source of electrical energy such as the vehicle battery. It will therefore be apparent that upon establishment of the grounded heating circuit, heat will be generated internally of the blade element by the resistance wire 28 and transferred therefrom through the tubular member 26 for distribution within the blade element 12. In order to more uniformly distribute the heat throughout the blade element, a heat conductive coil 36 made of copper wire for example, encircles the parallel spaced portions of the tubular member 26 in its folded condition and is thereby operative also to hold the resistance wire 28 and tubular member 26 assembled in its folded arrangement. Thus, the entire heating facilities 24 extend lengthwise and transversely through the blade element terminating in close spaced adjacency to the opposite longitudinal ends of the blade element so as to dissipate heat uniformly therealong and to flex with the blade element as it moves over the windshield surface. Also embedded within the blade element is the tubular coupling element 38 by means of which the projecting end portion of the resistance wire 28 is connected to the lead-in connection 34.

The lead-in connection 34 includes a flexible, non-conductive core 40 made of rubber for example, about which there is coiled an electrical conductor 42 such as copper wire through which current is conducted for supply to the resistance wire 28.

The end portion of the coil conductor 42 is therefore held in contact with the projecting end portion of the resistance wire 28 by the non-conductive coupling element 38. A non-conductive sheathing 44 made of a heat resistance material such as that of the blade element 12 itself, embeds the coil conductor 42 and core and also extends into the blade element embedding the coupling element 38 within. Heat loss outside of that generated within the blade element is thereby held to a minimum.

From the foregoing description, the construction, operation and utility of the heated wiper blade assembly will be apparent. It will therefore be appreciated, that the construction of the wiper blade may be tailored to any particular installational requirement by varying the gauge of the resistance wire, the number of folds or lengths thereof and the choice of materials available having generally the same properties as specified in connection with the various parts described. With existing materials now available and the vehicle battery sources of electrical energy in common use, the construction of the present invention provides a more practical means for producing the requisite heating. Also, the more even distribution of the heat dissipated by the blade assembly achieves the objectives of the invention in a most efficient manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a heated windshield wiper assembly having a heat resistant flexible blade element and a conductive rigid blade holder, electrical heating means comprising, a flexible tubular member embedded in said blade element and made of non-conductive material extending in folded condition along the length of said blade element for flexing therewith, a resistance wire extending through said tubular member for generating heat in response to flow of electrical current therethrough, coupling means enclosing opposite end portions of said resistance wire which project from the tubular member, said end portions being respectively connected to a lead-in connection and the blade holder for establishing a grounded heating circuit, and heat conductive coil means encircling said tubular member in folded condition for uniformly distributing heat transferred thereto from the resistance wire throughout the blade element, said coil means and said coupling means being completely embedded in the blade element spaced from the blade holder.

2. The combination of claim 1 wherein said lead-in connection comprises, a flexible, non-conductive core, a conductor coiled thereabout and held in electrical contact by said coupling means with one of said end portions of the resistance wire within the blade element, and a heat resistant sheathing embedding the coiled conductor and extending into the blade element.

3. In a heated windshield wiper assembly having a heat resistant flexible blade element and a conductive, rigid blade holder, electrical heating means embedded in the blade element spaced from the holder; comprising, heat distributing means, folded resistance means extending through said heat distributing means in non-conductive relation thereto, and coupling means embedded in the blade element for establishing electrical connections between the resistance means, the blade holder and a source of electrical energy.

4. A flexible blade for windshield wipers, said blade having a head portion, a holder embracing said head portion, a heating element embedded in said blade and spaced from said head portion, said heating element comprising, an insulated resistance wire substantially exceeding the length of said wiper blade, a conductive wire coiled about said insulated resistance wire for holding thereof in a folded condition extending substantially the length of said wiper blade, a source of electrical energy connected to the resistance wire at one end of the wiper blade, and grounding means connecting the resistance wire to the holder adjacent the other end of the wiper blade.

5. In combination with a flexible wiper blade, a heating element completely embedded in said wiper blade and extending longitudinally in one direction substantially the length of the blade, said heating element comprising, an elongated heating resistance wire having a length substantially exceeding the length of said wiper blade, flexible insulating means enclosing the resistance wire in a folded condition including a plurality of parallel portions extending substantially the length of the blade in said one direction and spaced from each other in a direction transverse to said one direction, conductive means wrapped about said parallel spaced portions of the flexible insulating means for holding same in the folded condition and for uniformly distributing heat generated by current passing through the resistance wire, said conductive means including coiled wire flexing with the wiper blade and the flexible insulating means.

References Cited by the Examiner

UNITED STATES PATENTS

| | | | |
|---|---|---|---|
| 1,622,416 | 3/1927 | Burton | 15—250.07 |
| 1,873,118 | 8/1932 | Gooley et al. | 92—51 |
| 2,635,168 | 4/1953 | Lerza et al. | 277—84 |
| 2,715,674 | 8/1955 | Abbott et al. | 219—212 |
| 2,721,351 | 10/1955 | Nitzel et al. | 15—250.06 |
| 2,733,472 | 2/1956 | Karstens et al. | 15—250.06 |
| 2,844,696 | 7/1956 | Custer | 219—345 |
| 2,871,329 | 1/1959 | Morris | 219—570 |
| 2,923,022 | 2/1960 | Theckston | 15—250.07 |
| 3,056,011 | 9/1962 | Deacon | 219—345 |

RICHARD M. WOOD, *Primary Examiner.*

V. Y. MAYEWSKY, *Assistant Examiner.*